United States Patent
Sonoda

(10) Patent No.: US 8,332,691 B2
(45) Date of Patent: Dec. 11, 2012

(54) VERIFICATION APPARATUS, VERIFICATION METHOD, AND COMPUTER PRODUCT

(75) Inventor: Masataka Sonoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 624 days.

(21) Appl. No.: 12/414,661

(22) Filed: Mar. 30, 2009

(65) Prior Publication Data

US 2009/0249124 A1  Oct. 1, 2009

(30) Foreign Application Priority Data

Mar. 31, 2008 (JP) ................................. 2008-090929

(51) Int. Cl.
*G06F 11/00* (2006.01)
(52) U.S. Cl. ....................................................... 714/37
(58) Field of Classification Search ...................... 714/37
See application file for complete search history.

(56) References Cited

U.S. PATENT DOCUMENTS

| 6,499,117 | B1 * | 12/2002 | Tanaka | 714/49 |
| 2003/0221188 | A1 * | 11/2003 | Matsumoto et al. | 717/129 |
| 2007/0050682 | A1 * | 3/2007 | Takuma et al. | 714/45 |
| 2008/0270988 | A1 * | 10/2008 | Li et al. | 717/125 |

FOREIGN PATENT DOCUMENTS

| JP | 8-190584 A | 7/1996 |
| JP | 2001-155062 A | 6/2001 |
| JP | 2004-310311 A | 11/2004 |

* cited by examiner

*Primary Examiner* — Scott Baderman
*Assistant Examiner* — Jigar Patel
(74) *Attorney, Agent, or Firm* — Fujitsu Patent Center

(57) ABSTRACT

A main step is retrieved from an operations process subject to verification. Mapping information is referenced to further retrieve a preventive measure against an error expected upon execution of the main step. Based on the order in which the preventive measure is executed within the operations process, it is determined whether the preventive measure has been incorporated into the operations process at a correct position and a result of the determination is output.

10 Claims, 20 Drawing Sheets

FIG.2

| STEP | TAG ID | | |
|---|---|---|---|
| | T1 | T2 | T3 |
| PATCH APPLICATION | EXECUTING PERSON: ADMINISTRATOR | SUBJECT: IT SYSTEM | TYPE: OPERATION |

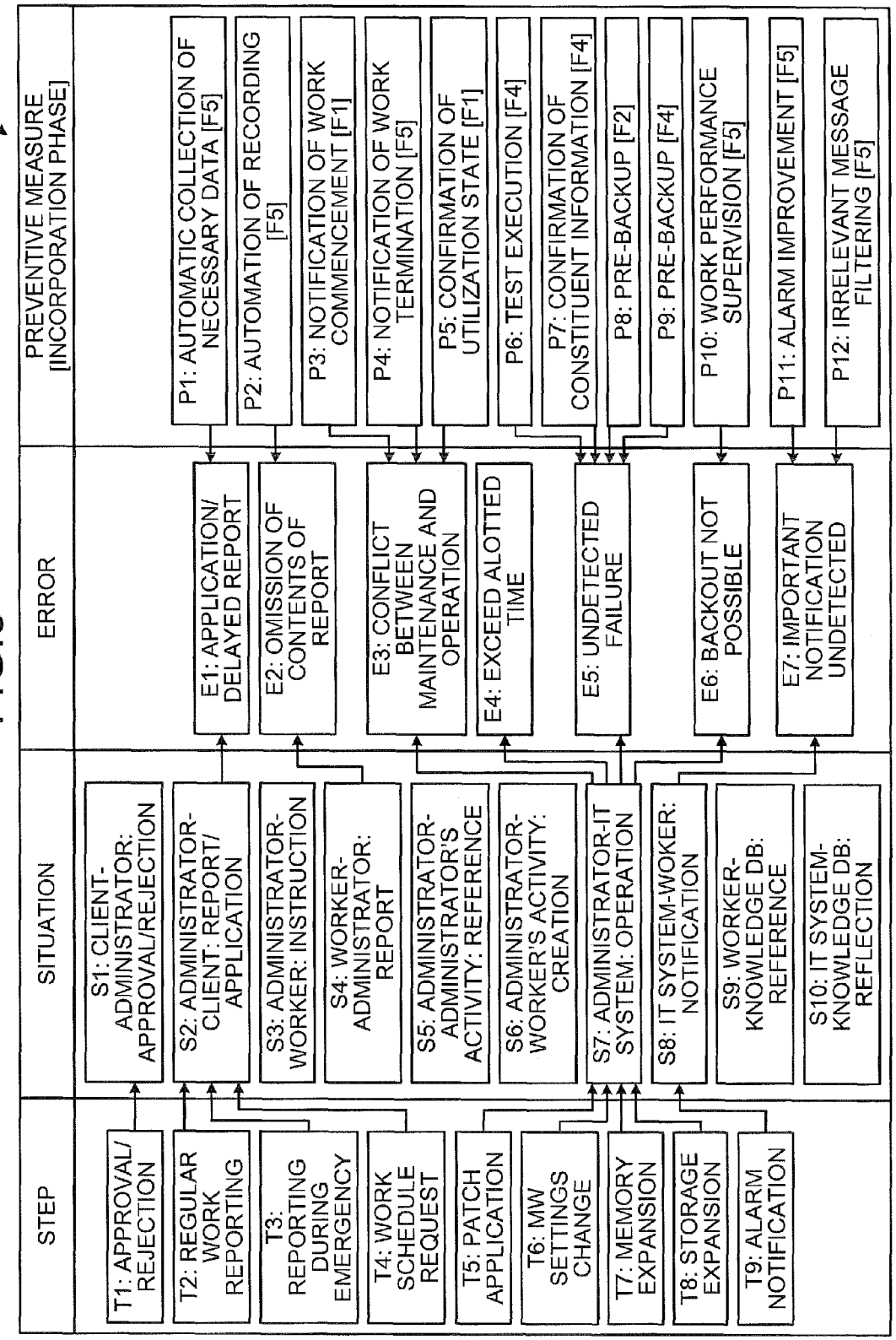

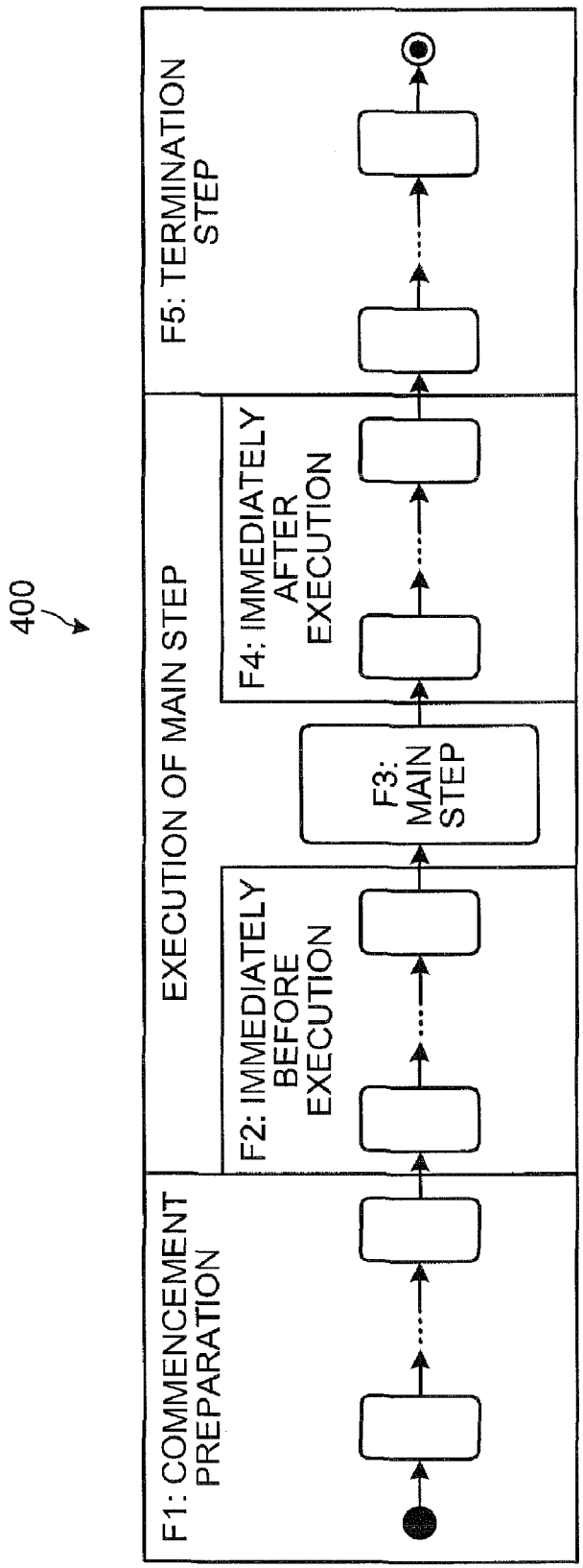

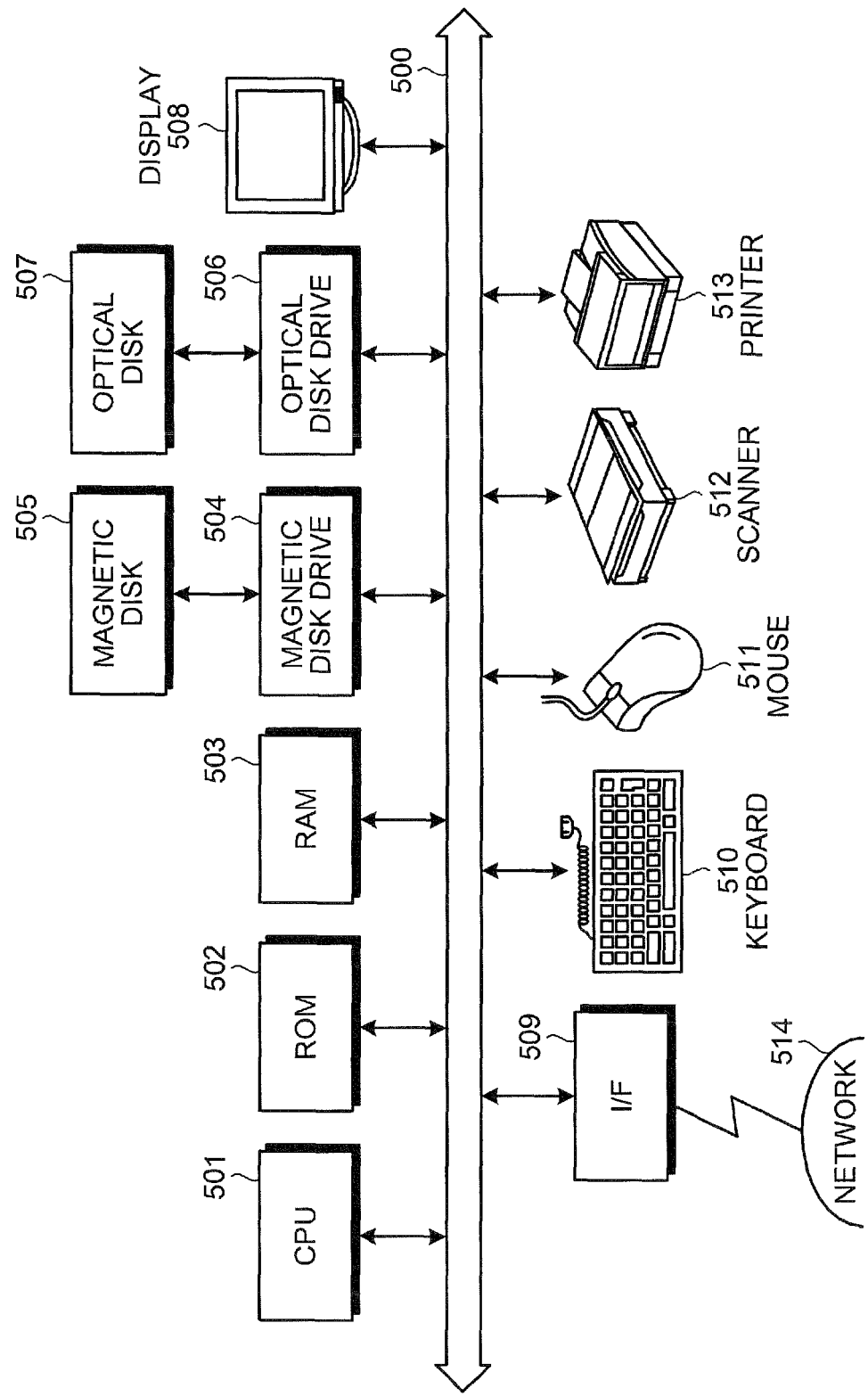

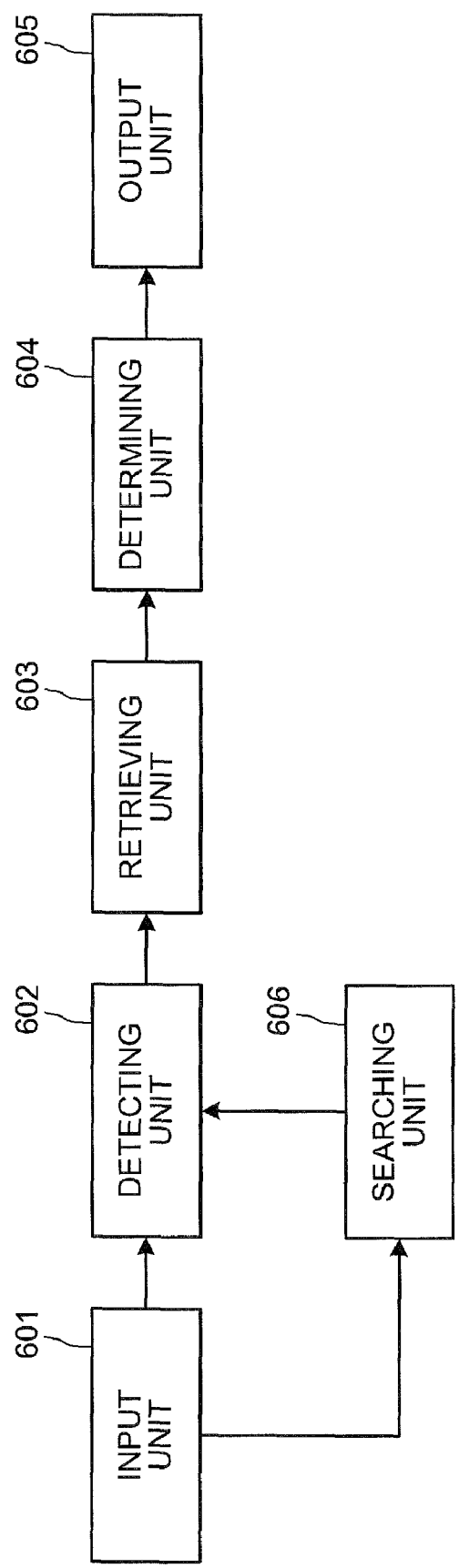

```
<?xml version="1.0" encoding="UTF-8" standalone="yes"?>
<ACAll xmlns="urn:xmlns-fujitsu-com:autonomic200X-XX"
xmlns:fac="urn:xmlns-fujitsu-com:ac-faculty200X-XX"
xmlns:asn="urn:xmlns-fujitsu-com:assign200X-XX"
xmlns:mis="urn:xmlns-fujitsu-com:mission200X-XX"
xmlns:pol="urn:xmlns-fujitsu-com:ac-policy200X-XX"
xmlns:act="urn:xmlns-fujitsu-com:ac-action200X-XX"
```

```
urn:xmlns-fujitsu-com:ac-common200X-XX ACCommon.xsd
urn:xmlns-fujitsu-com:ac-policy200X-XX ACPolicy.xsd
urn:xmlns-fujitsu-com:ac-process200X-XX ACProcess.xsd">
  <ACActivities>
    <flow:ACActivity name="PATCH APPLICATION ACTIVITY" id="acactivity01">
      <flow:Activity id="activity01" isSingleExecution="false">
        <flow:ActivityPartition name="ADMINISTRATOR" id="ap01" isDimension="false"
isExternal="false" roleAssign="ACMTID_93_655_20080126-153221-203">
          <flow:Action name="STOP SERVICE" id="action001" incoming="cf006"
outgoing="cf007" partition="ap01" requiredtime="," />
          <flow:Action name="PRE-BACKUP" id="action002" incoming="cf007"
outgoing="cf008" partition="ap01" requiredtime="," />
          <flow:Action name="PATCH APPLICATION" id="action003" incoming="cf008"
outgoing="cf009" partition="ap01" requiredtime="," />
          <flow:Action name="REBOOT" id="action004" incoming="cf009" outgoing="cf010"
partition="ap01" requiredtime="," />
          <flow:InterruptibleActivityRegion>
          <flow:Action name="TEST EXECUTION" id="action005" incoming="cf010" outgoing="cf011"
partition="ap01" requiredtime="," />
          <flow:AcceptEventAction name="FAILURE FOUND" id="aptea001" outgoing="cf020"
partition="ap01" />
          </flow:InterruptibleActivityRegion>
          <flow:Action name="RECOVERY" id="action006" incoming="cf020" outgoing="cf021"
partition="ap01" requiredtime="," />
```

```
          <flow:ControlFlow name="CF18" id="cf018" source=
/>
          <flow:ControlFlow name="CF19" id="cf019" source="aptea002" target="action011"
/>
          <flow:ControlFlow name="CF20" id="cf020" source="aptea001" target="action006"
/>
          <flow:ControlFlow name="CF21" id="cf021" source="action006" target="exit001"
/>
        </flow:Transition>
      </flow:ACActivity>
    </ACActivities>
</ACAll>
```

| ERROR | PREVENTIVE MEASURE | | | INCORPORATION |
|---|---|---|---|---|
| | ID | ACTION NAME | INCORPORATION PHASE | |
| E3: CONFLICT BETWEEN MAINTENANCE AND OPERATION | P3 | NOTIFICATION OF WORK COMMENCEMENT | COMMENCEMENT PREPARATION | NOT INCORPORATED |
| | P4 | NOTIFICATION OF WORK TERMINATION | TERMINATION STEP | NOT INCORPORATED |
| | P5 | CONFIRMATION OF UTILIZATION STATE | COMMENCEMENT PREPARATION | NOT INCORPORATED |
| E5: UNDETECTED FAILURE | P6 | TEST EXECUTION | IMMEDIATELY AFTER EXECUTION | NOT INCORPORATED |
| | P7 | CONFIRMATION OF CONSTITUENT INFORMATION | IMMEDIATELY AFTER EXECUTION | NOT INCORPORATED |
| | P8 | PRE-BACKUP | IMMEDIATELY BEFORE EXECTUION | NOT INCORPORATED |
| | P9 | POST-BACKUP | IMMEDIATELY AFTER EXECUTION | NOT INCORPORATED |
| E6: BACKOUT NOT POSSBILE | P10 | WORK PERFORMANCE SUPERVISION | TERMINATION STEP | NOT INCORPORATED |

| PREVENTIVE MEASURE FOR INCORRECT INCORPORATION | TYPE OF NONCOMPLIANCE | PERTINENT PREVENTIVE MEASURE |
|---|---|---|
| POST-BACKUP | 2-3 | WORK PERFORMANCE SUPERVISION |

FIG.11

| EXPECTED ERROR | PREVENTIVE MEASURE | | | |
|---|---|---|---|---|
| | ID | ACTION NAME | INCORPORATION PHASE | INCORPORATION STATUS |
| E3: CONFLICT BETWEEN MAINTENANCE AND OPERATION | P3 | NOTIFICATION OF WORK COMMENCEMENT | COMMENCEMENT PREPARATION | INCORPORATED |
| | P4 | NOTIFICATION OF WORK TERMINATION | TERMINATION STEP | INCORPORATED |
| | P5 | NOTIFICATION OF UTILIZATION STATUS | COMMENCEMENT PREPARATION | INCORPORATED |
| E5: UNDETECTED FAILURE | P6 | TEST EXECUTION | IMMEDIATELY AFTER EXECUTION | NOT INCORPORATED |
| | P7 | CONFIRMATION OF CONSTITUENT INFORMATION | IMMEDIATELY AFTER EXECUTION | INCORPORATED |
| | P8 | PRE-BACKUP | IMMEDIATELY BEFORE EXECUTION | INCORPORATED |
| | P9 | POST-BACKUP | IMMEDIATELY AFTER EXECUTION | INCORPORATED |
| E6: BACKOUT NOT POSSIBLE | P10 | WORK PERFORMANCE SUPERVISION | TERMINATION STEP | INCORPORATED |

| ID | PREVENTIVE MEASURE NAME | KEY FORM | KEY ACTION ||||| APPLICABLE OBJECT |||
|---|---|---|---|---|---|---|---|---|---|---|
| | | | ACTION CONTENTS | EXECUTING PERSON | OBJECT | INCORPORATION PHASE | PATCH APPLICATION | MW SETTINGS CHANGE | MEMORY EXPANSION |
| 1 | NOTIFICATION OF COMMENCEMENT | TRANSCEND ROLES | NOTIFICATION OF WORK COMMENCEMENT | IDENTICAL TO MAIN STEP | OTHER ROLE | COMMENCEMENT PREPARATION | ○ | ○ | ○ |
| 2 | CONFIRMATION OF UTILIZATION | ERROR SYSTEM | CONFIRMATION OF UTILIZATION STATE | IDENTICAL TO MAIN STEP | ENTIRE SYSTEM | COMMENCEMENT PREPARATION | ○ | ○ | ○ |
| 3 | CONFIRMATION OF APPLICATION | ERROR SYSTEM | CONFIRMATION OF APPLICATION | IDENTICAL TO MAIN STEP | SERVER | IMMEDIATELY AFTER EXECUTION | ○ | | |
| 4 | CONFIRMATION OF PARAMETER | ERROR SYSTEM | CONFIRMATION OF APPLICATION | IDENTICAL TO MAIN STEP | SERVER | IMMEDIATELY AFTER EXECUTION | | ○ | |
| 5 | CONFIRMATION OF CONFIGURATION | ERROR SYSTEM | CONFIRMATION OF CONFIGURATION | IDENTICAL TO MAIN STEP | SERVER | IMMEDIATELY AFTER EXECUTION | | | ○ |
| 6 | WORK PERFORMANCE SUPERVISION | ERROR SYSTEM | SUPERVISION OF PERFORMANCE | IDENTICAL TO MAIN STEP | ENTIRE SYSTEM | TERMINATION STEP | ○ | ○ | ○ |
| 7 | NOTIFICATION OF TERMINATION | TRANSCEND ROLES | NOTIFICATION OF WORK TERMINATION | IDENTICAL TO MAIN STEP | OTHER ROLE | TERMINATION STEP | ○ | ○ | ○ |

FIG.17

| ID | PREVENTIVE MEASURE NAME | KEY FORM | KEY ACTION ||||| INCORPORATION STATUS |
|---|---|---|---|---|---|---|---|
| | | | ACTION CONTENTS | EXECUTING PERSON | OBJECT | INCORPORATION PHASE | |
| 1 | NOTIFICATION OF COMMENCEMENT | TRANSCEND ROLES | NOTIFICATION OF WORK COMMENCEMENT | IDENTICAL TO MAIN STEP | OTHER ROLE | COMMENCEMENT PREPARATION | NOT INCORPORATED |
| 2 | CONFIRMATION OF UTILIZATION | ERROR SYSTEM | CONFIRMATION OF UTILIZATION STATE | IDENTICAL TO MAIN STEP | ENTIRE SYSTEM | COMMENCEMENT PREPARATION | NOT INCORPORATED |
| 3 | CONFIRMATION OF APPLICATION | ERROR SYSTEM | CONFIRMATION OF APPLICATION | IDENTICAL TO MAIN STEP | SERVER | IMMEDIATELY AFTER EXECUTION | NOT INCORPORATED |
| 6 | WORK PERFORMANCE SUPERVISION | ERROR SYSTEM | SUPERVISION OF PERFORMANCE | IDENTICAL TO MAIN STEP | ENTIRE SYSTEM | TERMINATION STEP | NOT INCORPORATED |
| 7 | NOTIFICATION OF TERMINATION | TRANSCEND ROLES | NOTIFICATION OF WORK TERMINATION | IDENTICAL TO MAIN STEP | OTHER ROLE | TERMINATION STEP | NOT INCORPORATED |

1700

VERIFICATION APPARATUS, VERIFICATION METHOD, AND COMPUTER PRODUCT

CROSS-REFERENCE TO RELATED APPLICATIONS

This application is based upon and claims the benefit of priority from the prior Japanese Patent Application No. 2008-090929, filed on Mar. 31, 2008, the entire contents of which are incorporated herein by reference.

BACKGROUND OF THE INVENTION

1. Field of the Invention

The present invention pertains to verifying reliability of an operations process for information technology (IT) system management.

2. Description of the Related Art

Recently, IT systems are becoming larger and more complicated. IT system operation management requires more specialized knowledge ever than before and involves the performance of necessary steps according to a proper procedure (hereinafter, operations process). At the same time, rapidly changing business environments demand that IT systems be able to accommodate change flexibly and swiftly.

As a result, man-hours for labor such as with a system change have increased and many operation errors resulting from human error have been reported. Complicated operation management, flaws in operation manuals, the skills or know-how of personnel, etc. cause the errors. To solve such problems, a reliable operations process must be performed.

A key point for reliable execution of an operations process is error prevention. When an error occurs, the cause is analyzed to create a preventive measure that is incorporated into the operations process to prevent a reoccurrence of the error. Hence, for the operations process to be reliable, preventive measures against past errors must be incorporated into the process.

However, at present, as operations processes are designed by humans, an operations process with insufficient preventive measures may be created as a result of inexperience or careless error on the part of the creator. Further, as operations processes are checked by humans, flaws may go undetected.

For these reasons, even if an operations process is concluded to have no problems at the check phase, the operations process may actually not be reliable and cause errors during execution. In light of such problems, in documents such as Japanese Patent Application Laid-Open Publication Nos. 2004-310311, H8-190584, and 2001-155062, techniques to support operation management of a system have been disclosed.

As for a method of checking whether a preventive measure has been incorporated into an operations process, a method using additional information (tag) is known. The tag information indicates attributes of each step of the operations process. Multiple tag information items (executing person, object of step, type of step, and so on) can appended to one step.

Circumstances at the time of execution can be known from the tag information. Additionally, for past errors, causes and preventive measures have already been examined. Therefore, the circumstances can be correlated with the past errors, thereby creating mapping information that can identify relationships among: 1) process, 2) situation, 3) error, and 4) preventive measure.

Preventive measures to be incorporated into the operations process can be identified by reference to the mapping information with the aid of the tag information. Further, by checking whether all the preventive measures have been incorporated into the operations process, oversights in preventive measure incorporation can be prevented.

According to the conventional technique, although it can be confirmed whether necessary prevent measures are included in the operations process, it cannot be known whether prevent measures have been incorporated at proper positions within the operations process. Some preventive measures need to be placed at a specific point or within a specific part to be functional.

Consequently, even if a preventive measure is included in the operations process, errors can occur during operation due to mislocation of the preventive measure. In this case, since the operations process needs be redesigned, design costs increase and the design period is prolonged.

Further, in many cases, since the flow of the operations process includes branches, the operations process has multiple paths. If a step that is a cause of an error and the preventive measure are on different paths, the preventive measure is often unable to function. The conventional techniques do not take into account the branches in the operations process. Consequently, in addition to the problems above, the omission of preventive measures occurs and the reliability of the operations process is significantly reduced.

SUMMARY OF THE INVENTION

It is an object of the present invention to at least solve the above problems in the conventional technologies.

A computer-readable recording medium according to one aspect of the present invention stores therein a computer program that causes a computer to execute detecting a main step from among a series of steps to be verified; retrieving from among the series of steps, a sub-step to be a preventive measure against an error expected at execution of the main step; determining whether a position where the sub-step is incorporated into the series of steps is correct based on a sequence in which the sub-step and the main step are executed; and outputting a result of the determining.

A verification apparatus according to another aspect of the present invention includes a detecting unit that detects a main step from among a series of steps to be verified; a retrieving unit that retrieves from among the series of steps, a sub-step to be a preventive measure against an error expected at execution of the main step; a determining unit that determines whether a position where the sub-step is incorporated into the series of steps is correct based on a sequence in which the sub-step and the main step are executed; and an output unit that outputs a result of the determining unit.

A verification method according to still another aspect of the present invention includes detecting a main step from among a series of steps to be verified; retrieving from among the series of steps, a sub-step to be a preventive measure against an error expected at execution of the main step; determining whether a position where the sub-step is incorporated into the series of steps is correct based on a sequence in which the sub-step and the main step are executed; and outputting a result of the determining.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a diagram of an example of tag information;

FIG. 3 is a diagram of an example of mapping information;

FIG. 4 is a diagram depicting incorporation phases of the operations process;

FIG. 5 is a block diagram of a verification apparatus according to an embodiment of the present invention;

FIG. 6 is a block diagram depicting a functional configuration of the verification apparatus;

FIG. 7 is a diagram depicting one example of design data;

FIG. 8 is a diagram depicting one example of a list of preventive measures;

FIG. 10 is a diagram depicting an example of a list of incorrect incorporations;

FIG. 11 is a diagram depicting an example of a preventive measures list;

FIG. 16 is a diagram depicting one example of a preventive measures list;

FIG. 17 is a diagram depicting one example of the essential preventive measures list;

DETAILED DESCRIPTION OF THE PREFERRED EMBODIMENTS

Referring to the accompanying drawings, exemplary embodiments according to the present invention are explained in detail below.

According to an exemplary embodiment, whether preventive measures that prevent possible errors from occurring during the execution of a main step have been incorporated at proper positions in an operations process for operations management of an IT system is confirmed, thereby securing reliability of the operations process.

An operations process is design data describing an execution sequence of steps in the operation management of an IT system such as a hotel reservation service and a company website browsing service.

Figure 1:
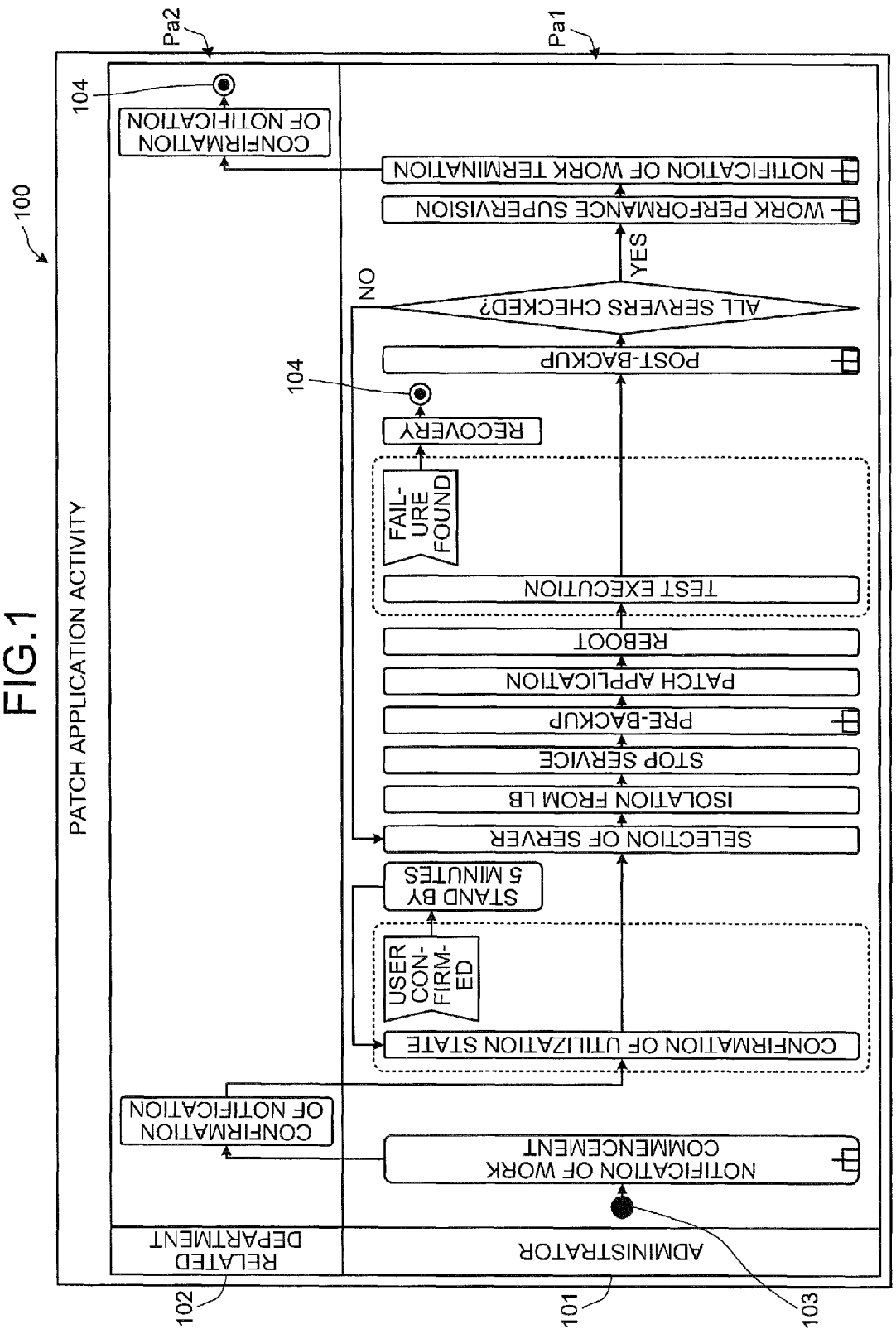
FIG. 1 is an activity diagram of one example of an operations process.

FIG. 1 is an activity diagram of one example of an operations process. As depicted in FIG. 1, an operations process 100 indicates the execution sequence of steps for patch application work in the IT system. The operations process 100 includes two executing persons (role): administrator 101 and related department 102.

Steps in a partition Pa1 are performed by the administrator 101 and steps in a partition Pa2 are performed by the related department 102. A black circle 103 indicates a starting point, and steps are executed in the sequence indicated by arrows until the end of the entire process indicated by a black circle with a border 104, an ending point.

A unit of the operations process 100 is called action. Each action has an action name. Each executing person (Role) executes steps according to the operations process 100.

Generally, a key point in the execution of an operations process (for example, the operations process 100) is error prevention. Namely, for the operations process to be highly reliable, the operations process must be designed to include the incorporation of preventive measures for past errors.

According to a first embodiment, as a method of checking whether preventive measures are incorporated into an operations process, tag information is used. The tag information includes attributes for each step of the operations process. One step may have multiple tag information items.

FIG. 2 is a diagram of an example of the tag information. As depicted in FIG. 2, tag information items T1 to T3 are attributes for a step "patch application". The tag information item T1 indicates that the person who executes the patch application is an "administrator". The tag information item T2 indicates that the subject of the patch application is an "IT system". The tag information item T3 indicates that the type of the patch application is "operation".

Combinations of the tag information items appended to each step indicate a situation under which the step is executed. In the example above, based on the combination of the tag information items T1 to T3, it is known that the patch application is a step that is executed under a situation in which the administrator operates the IT system.

Mapping information is used to identify a preventive measure and a main step in an operations process, a verification subject. FIG. 3 is a diagram of an example of mapping information. Mapping information 300 includes a modeling of relevancy between "step", "situation", "error", and "preventive measure" as depicted in FIG. 3.

A column "step" indicates main steps that are primary objectives in the operations process. Steps T1 to T9 are depicted in FIG. 3. For example, step T5 indicates patch application. A column "situation" indicates the situation in which each step is executed. Situations S1 to S10 are depicted in FIG. 3. For example, a situation S7 indicates that the administrator operates the IT system.

A column "errors" includes examples of past errors that occurred at the execution of the indicated step. For example, error E3 indicates that maintenance work and operation conflicted. Preventive measures are measures for preventing the errors. FIG. 3 depicts preventive measures P1 to P12. For example, the preventive measure P6 is test execution.

The mapping information 300 is referenced and arrows between processes T1 to T9, situations S1 to S10, errors E1 to E7, and preventive measures P1 to P12 can be followed to recognize relationships between "step", "situation", "error", and "preventive measure".

The mapping information 300 further includes incorporation phases F1 to F5 that indicate where the preventive measures P1 to P12 are to be incorporated into the operations process.

FIG. 4 is a diagram depicting incorporation phases of the operations process. As depicted in FIG. 4, a phase model 400 includes incorporation phases F1 to F5 separated chronologically within the operations process. The incorporation phase F1 (commencement preparation) is a phase preceding the execution of a main step.

The incorporation phase F2 (immediately before execution) is a phase immediately preceding the execution of the main step within the stage of executing the main step. The incorporation phase F3 (main step) is a phase at which the main step is executed. The incorporation phase F4 (immediately after execution) is a phase immediately subsequent to the execution of the main step within the stage of executing the main step.

The incorporation phase F5 (termination step) is a phase after the execution of the main step. Thus, the operations process sequentially proceeds through the phases from "commencement preparation", "immediately before execution", "main step", "immediately after execution" to "termination step". Namely, the execution sequence of the preventive measures can be identified from the incorporation phases F1 to F5.

According to the first embodiment, the mapping information 300 is referenced to confirm whether preventive measures concerning a main step of the operations process have been incorporated into the operations process. Verification of reliability (omission of preventive measures, and placement of preventive measures) of the operations process using the tag information appended to each step is explained below.

An operations process (for example, the operations process 100) is read and a main step registered in the mapping information 300 is detected from the operations process. A situation is identified from the tag information appended to the main step. With reference to the mapping information 300, potential errors under the situation identified and preventive measures against the errors are identified.

Steps in the operations process are read and it is checked whether the identified preventive measures have been incorporated into the operations process. If the preventive measures have not been incorporated, the mapping information 300 is referenced to report the preventive measures that have not been incorporated and the corresponding errors expected.

In addition, with reference to the incorporation phases F1 to F5 of the preventive measures confirmed to be in the operations process, it is determined whether each preventive measure has been incorporated at a correct position within the operations process. If the position of a preventive measure is wrong, the mapping information 300 is referenced and preventive measures incorporated at wrong positions and corresponding errors expected are reported.

When the operations process branches or the flow splits between the start (for example, the black circle 103 in FIG. 1) and the end (for example, the black circle with a white ring 104 in FIG. 1) creating multiple paths, the procedures above are performed for each path.

As set forth above, according to the first embodiment, the omission and the position of preventive measures for each main process of the operations process are checked to enable provision of a highly reliable operations process. Further, the work load and time consumed for design are reduced.

FIG. 5 is a block diagram of a verification apparatus according to an embodiment of the present invention. As depicted in FIG. 5, the verification apparatus includes a central processing unit (CPU) 501, a read-only memory (ROM) 502, a random access memory (RAM) 503, a magnetic disc drive 504, a magnetic disc 505, a optical disc drive 506, an optical disc 507, a display 508, an interface (I/F) 509, a keyboard 510, a mouse 511, a scanner 512, and a printer 513, connected to one another by way of a bus 500.

The CPU 501 governs overall control of the verification apparatus. The ROM 502 stores therein programs such as a boot program. The RAM 503 is used as a work area of the CPU 501. The magnetic disc drive 504, under the control of the CPU 501, controls reading/writing of data from or to the magnetic disc 505. The magnetic disc 505 stores therein the data written under control of the magnetic disc drive 504.

The optical disc drive 506, under the control of the CPU 501, controls reading/writing of data from or to the optical disc 507. The optical disc 507 stores therein the data written under control of the optical disc drive 506, the data being read by the verification apparatus.

As the optical disc 507, a compact disc read-only memory (CD-ROM), a Digital Versatile Disc (DVD), a magneto optical disc (MO), or a memory card may be employed. The display 508 displays a cursor, an icon, a tool box, and data such as document, image, and function information. The display 508 may be, for example, a cathode ray tube (CRT), a thin-film-transistor (TFT) liquid crystal display, or a plasma display.

The I/F 509 is connected to a network 514 such as the Internet through a telecommunications line and is connected to other devices by way of the network 514. The I/F 509 manages the network 514 and an internal interface, and controls the input and output of data from or to external devices. The I/F 509 may be, for example, a modem or a local area network (LAN) adapter.

The keyboard 510 is equipped with keys for the input of characters, numerals, and various instructions, and data is entered through the keyboard 510. The keyboard 510 may be a touch-panel input pad or a numeric keypad. The mouse 511 performs cursor movement, range selection, and movement, size change, etc., of a window. The mouse 511 may be a trackball or a joystick provided the trackball or joystick has similar functions as a pointing device.

The scanner 512 optically reads an image and takes in the image data into the verification apparatus. The scanner 512 may have an optical character recognition (OCR) function as well. The printer 513 prints image data and document data. The printer 513 may be, for example, a laser printer or an ink jet printer.

FIG. 6 is a block diagram depicting a functional configuration of the verification apparatus. As depicted in FIG. 6, the verification apparatus includes an input unit 601, a detecting unit 602, a retrieving unit 603, a determining unit 604, an output unit 605, and a searching unit 606.

The functional units 601 to 606 are implemented by causing the CPU 501 to execute programs related to the functional units 601 to 606 and stored in a memory unit such as the ROM 502 or RAM 503 of the verification apparatus, or implemented by an input-output I/F. Data output from the functional units 601 to 606 is stored in the memory unit. A functional unit at a connection destination indicated by an arrow in FIG. 6 reads, from the memory unit, the data output from a functional unit at the corresponding connection source and causes a relevant program to be executed by the CPU 501.

The input unit 601 receives input for the operations process, a verification subject. The operations process is design data in which the execution sequence of a series of steps for operation management of a system is described in, for example, the extensible markup language (XML). The operations process may be directly input into the verification apparatus or be acquired from an external computer apparatus.

Design data concerning the operations process 100 in FIG. 1 is explained. FIG. 7 is a diagram depicting one example of the design data. As depicted in FIG. 7, design data 700 includes the sequence in which the steps of the operations process 100 described in XML are executed. The design data 700 indicates an operations process concerning patch application activity for an IT system.

When tag information (for example, tag information T1 to T3 of FIG. 2) is appended to a step, the XML description of the tag information is added to the design data 700. In this way, attributes (executing person, object of the step, step type, etc.) of each step of the operations process 100 can be known.

The reference of the explanation returns to FIG. 6. The detecting unit 602 detects a main step from among the steps to be verified. A main step is a single step that is a primary objective of the operations process. Specifically, the detecting unit 602 references the mapping information created by the administrator of the system and arbitrarily detects a main step in the operations process.

The mapping information is information with which relationships between "step", "situation", "error", and "preventive measure" are identified and is created by the administrator of the system. The mapping information is described in the same language as the language (for example, XML) that describes the operations process to be verified. The mapping information may be stored in the memory unit such as the magnetic disc 505 or the optical disc 507, or may be acquired by direct input to the verification apparatus.

More specifically, for example, the detecting unit 602 reads the design data 700 received by the input unit 601 and references the mapping information 300 (see FIG. 3) to detect a main step in the operations process 100. In this example, "patch application" coinciding with the step T5 registered in the mapping information 300 is detected as a main step.

The retrieving unit 603 retrieves from the steps a sub-step to be a preventive measure against an error that is expected at execution of the main step detected by the detecting unit 602. The sub-step to be a preventive measure is a step at which an action is executed to become a preventive measure. Hereinafter, in the first embodiment, "sub-step to be a preventive measure" is simply written as "preventive measure".

To retrieve a preventive measure, a situation is identified based on the tag information appended to the main step detected by the detecting unit 602. For example, when the tag information T1 to T3 depicted in FIG. 2 is appended to the main step, the situation S7 in which the administrator operates the IT system is identified.

Next, by referencing the mapping information 300, an error expected under the identified situation is identified. In this example, the errors E3 to E6 correlated with the situation S7 are identified. By referencing the mapping information 300, a preventive measure correlated with the identified error is identified. In this example, the preventive measures P3 to P10 correlated with the errors E3 to E6 are identified (here, a list of preventive measures, explained hereinafter, is created).

The detecting unit 602 detects an arbitrary step in the operations process 100. At this point, successive steps may be detected according to the execution sequence of the operations process 100. The retrieving unit 603 compares the steps detected by the detecting unit 602 with the preventive measures P3 to P10 to retrieve a preventive measure against an error expected at execution of the main step (patch application).

FIG. 8 is a diagram depicting one example of a list of preventive measures. As depicted in FIG. 8, a preventive measures list 800 includes information concerning preventive measures and incorporation status for each error expected at the execution of the main step detected by the detecting unit 602.

Specifically, for each error E3, E5, E6 (concerning E4, a preventive measure has not yet been registered), an ID identifying the preventive measure, an action name for the preventive measure, and an incorporation phase for the preventive measure are indicated. In an incorporation status field, a term "not incorporated" indicates that the preventive measure has not yet been retrieved by the retrieving unit 603, and a term "incorporated" indicates that the preventive measure has been retrieved by the retrieving unit 603.

The determining unit 604 determines whether a preventive measure that has not yet been retrieved by the retrieving unit 603 remains among the preventive measures against errors having occurred at the execution of the main step detected by the detecting unit 602, the execution of the main step being in a situation indicated by attribute information (for example, the tag information T1 to T3). Specifically, for example, the preventive measures list 800 is referenced to determine whether there is a preventive measure having the "not incorporated" status.

In addition, the determining unit 604 determines whether a preventive measure has been incorporated into a correct position based on the execution sequence of the preventive measures retrieved by the retrieving unit 603 for the main step. Specifically, for example, based on the incorporation phases F1 to F5 of the preventive measures, it is determined whether the position of preventive measure in the operations process 100 is correct.

In detail, the position of a preventive measure is judged based on the rules below obtained from the incorporation phases of the preventive measures. Rule 1-1 is that a preventive measure whose incorporation phase is "commencement preparation" (incorporation phase F1) or "immediately before execution" (incorporation phase F2) is always incorporated at a position before the main step (incorporation phase F3). Rule 1-2 is that a preventive measure whose incorporation phase is "immediately after execution" (incorporation phase F4) or "termination step" (incorporation phase F5) is always incorporated at a position after the main step (incorporation phase F3).

The determining unit 604 determines, for example, whether a positional relationship between a main step and a preventive measure fulfills Rule 1-1 or 1-2 to determine whether the position of incorporation is correct. The position of incorporation may be specified based on the order of read-in when the steps to be verified are read in sequentially from the beginning.

In addition, when the retrieving unit 603 retrieves a first and a second preventive measure against errors expected at execution of the main step, the determining unit 604 determines whether the first preventive measure has been incorporated into a correct position based on the order in which the first preventive measure and the second preventive measure are executed. Specifically, for example, based on the incorporation phase F1 to F5 of the first preventive measure and the incorporation phase F1 to F5 of the second preventive measure, it is determined whether the position of incorporated preventive measures are correct.

In detail, the position of incorporation is judged based on the rules below obtained from the incorporation phases of the preventive measures. Rule 2-1 is that a preventive measure whose incorporation phase is "commencement preparation" (incorporation phase F1) is incorporated at a position before a preventive measure whose incorporation phase is "immediately before execution" (incorporation phase F2), "immediately after execution" (incorporation phase F4), or "termination step" (incorporation phase F5).

Rule 2-2 is that a preventive measure whose incorporation phase is "immediately before execution" (incorporation phase F2) is incorporated at a position after a preventive measure whose incorporation phase is "commencement preparation" (incorporation phase F1), and is incorporated at a position before a preventive measure whose incorporation phase is "immediately after execution" (incorporation phase F4) or "termination step" (incorporation phase F5).

Rule 2-3 is that a preventive measure whose incorporation phase is "right after execution" (incorporation phase F4) is incorporated at a position after a preventive measure whose incorporation phase is "commencement preparation" (incorporation phase F1) or "right before execution" (incorporation phase F2), and is incorporated at a position before a preventive measure whose incorporation phase is "termination step" (incorporation phase F5).

Rule 2-4 is that a preventive measure whose incorporation phase is "termination step" (incorporation phase F5) is incorporated at a position after a preventive measure whose incorporation phase is "commencement preparation" (incorporation phase F1), "immediately before execution" (incorporation phase F2), or "immediately after execution" (incorporation phase F4). When at least one of the rules 2-1 to 2-4 is not fulfilled, the determining unit 604 determines that the position of incorporation of a preventive measure is wrong.

Figure 9:
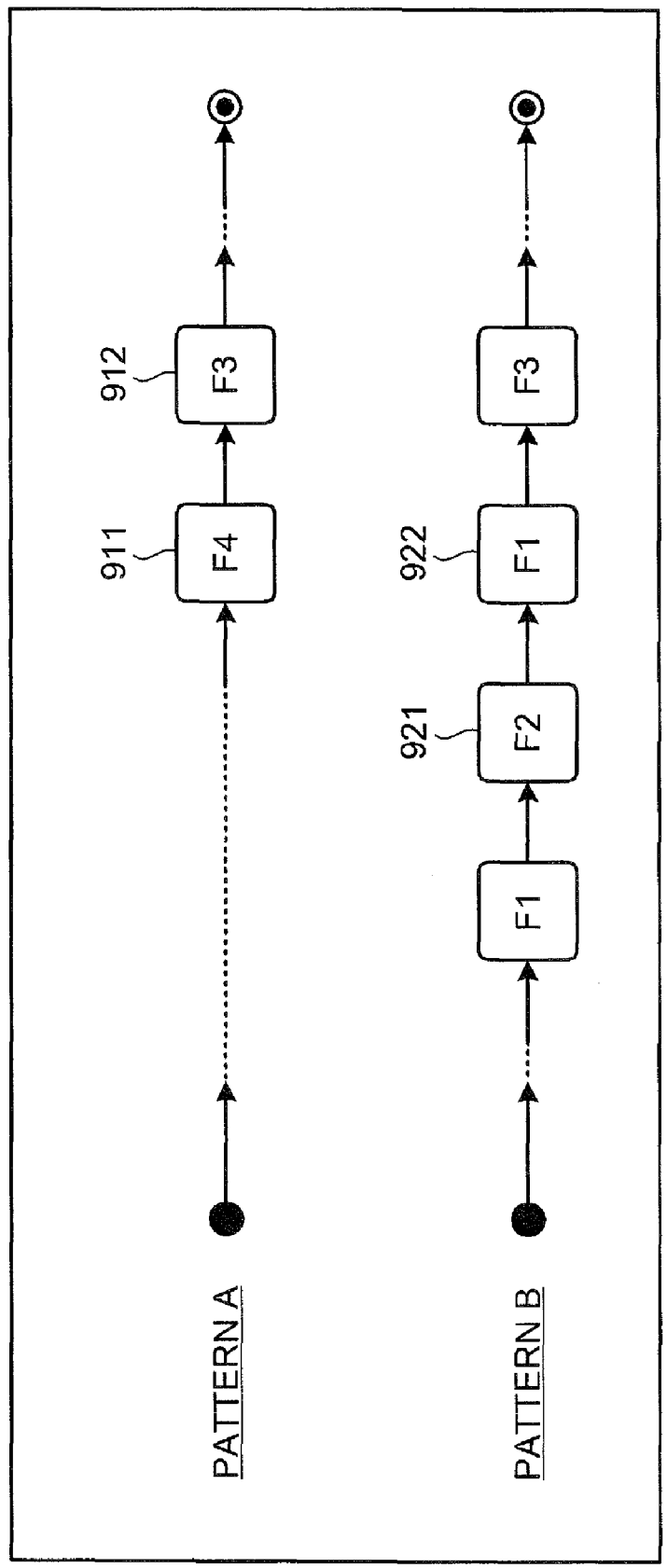
FIG. 9 is a diagram depicting an example of a rule violation.

FIG. 9 is a diagram depicting an example of a rule violation. In FIG. 9, patterns A and B depict steps of different operations processes. In FIG. 9, a black circle indicates an initial node of an operations process, a black circle with a border indicates a final node of the operations process, and F1 to F4 indicate incorporation phases.

In pattern A, a preventive measure (step 911) of incorporation phase F4 ("immediately after execution") is incorporated at a position before the main step (step 912) of the incorporation phase F3 (main step), violating the rule 1-2. In pattern B, a preventive measure (step 922) of the incorporation phase F1 ("commencement preparation") is incorporated at a position after a preventive measure (step 921) of the incorporation phase F2 ("immediately before execution"), violating the rules 2-1 and 2-2.

The output unit 605 outputs a result of the determination by the determining unit 604. The form of output by the output unit 605 may be any one of display on the display 508, print-out by the printer 513, data output to memory (storage), and transmission to an external computer apparatus.

Specifically, for example, an error message may be output identifying a preventive measure whose position of incorporation has been determined to be wrong by the determining unit 604. An error message may be output identifying the first preventive measure and the second preventive measure whose order of execution is wrong.

An example of a list of incorrect incorporations identifying the first and second preventive measures whose order of execution is wrong is explained. FIG. 10 is a diagram depicting an example of the list of incorrect incorporations. As depicted in FIG. 10, a list of incorrect incorporations 1000 includes a preventive measure that violates a rule, the type of noncompliance, and a pertinent preventive measure.

Once a designer views the list of incorrect incorporations 1000, the designer recognizes that a preventive measure "post-backup" violates the rule 2-3 and with respect to a preventive measure "work performance supervision". In this case, the designer corrects design data to change the positional relationship between "post-backup" and "work performance supervision".

The output unit 605 may output a retrieval result list that reflects results identifying preventive measures that have not been retrieved by the retrieving unit 603. At this time, an error message may be output identifying a sub-step that has not been retrieved by the retrieving unit 603.

FIG. 11 is a diagram depicting an example of the preventive measures list. As depicted in FIG. 11, a preventive measures list 1100, for each error expected at execution of the main step detected by the detecting unit 602, includes information concerning a preventive measure and incorporation status.

Specifically, the incorporation status of a preventive measure that has not been retrieved by the retrieving unit 603 is "not incorporated". The designer views the preventive measures list 1100 and recognizes that a preventive measure "test execution" to be incorporated into the operations process has not been incorporated. In this case, the designer makes a correction to the design data by adding "test execution" to the operations process.

Figure 12:
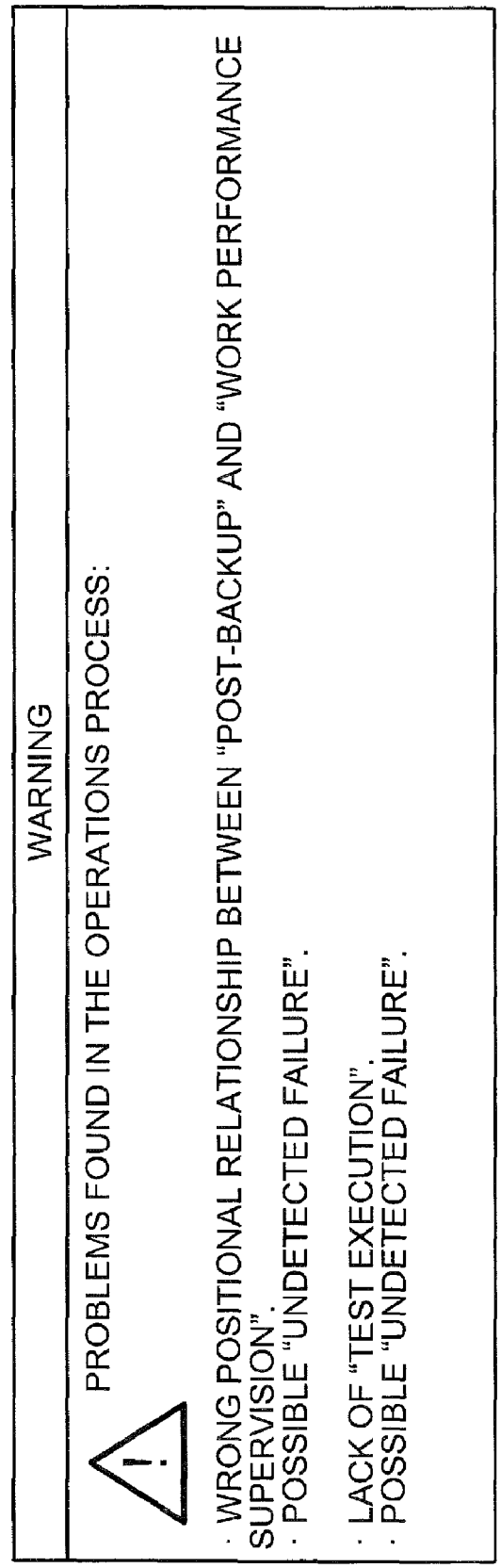
FIG. 12 is a diagram depicting an example of an error message.

The output unit 605 may output an error message identifying possible errors that may be caused by the execution of the preventive measures in an incorrect sequence and/or by the existence of preventive measures that have not been retrieved. FIG. 12 is a diagram depicting an example of an error message.

In FIG. 12, an error message 1200 warns that the relative positions of "post-backup" and "work performance supervision" are wrong and "undetected failure" is expected. Further, the error message 1200 includes a message that "test execution" has not been incorporated and warns that "undetected failure" is expected.

Reference of explanation returns to FIG. 6, the searching unit 606 searches for a path from an initial step to a final step among the steps to be verified. Specifically, the searching unit 606 searches for all the branch paths in the operations process. An example of a search result of the searching unit 606 is explained.

Figure 13:
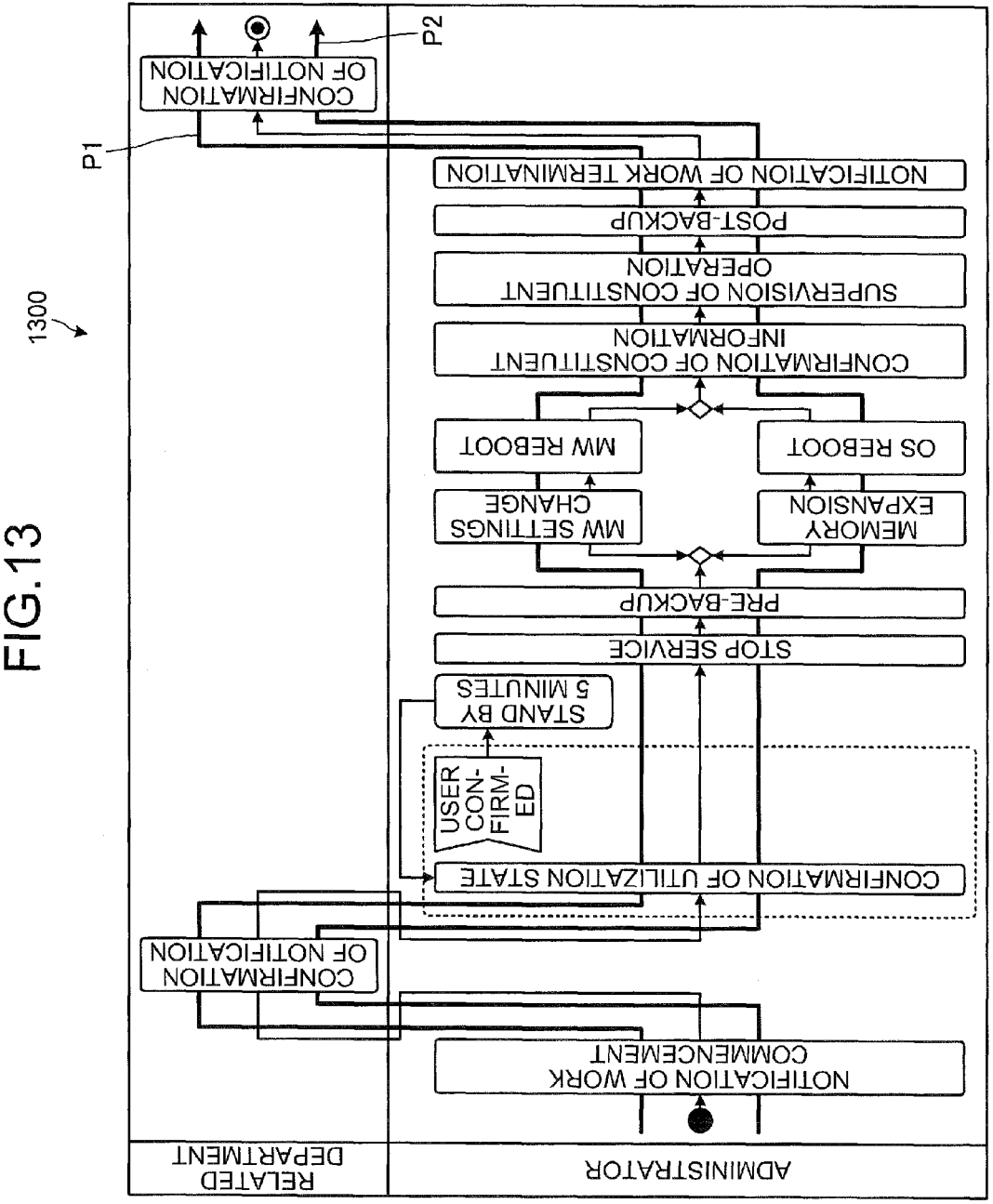
FIG. 13 is an activity diagram depicting an example of an operations process including multiple paths.

FIG. 13 is an activity diagram depicting an example of an operations process including multiple paths. As depicted in FIG. 13, an operations process 1300 includes paths P1 and P2 retrieved by the searching unit 606. When multiple paths are included in the operations process 1300, a series of processing at the detecting unit 602, the retrieving unit 603, the determining unit 604, and the output unit 605 is executed for each of paths P1 and P2.

For each of paths P1 and P2, the operations process 1300 is created and a series of processing at the detecting unit 602, the retrieving unit 603, the determining unit 604, and the output unit 605 is executed. Specifically, design data concerning the operations process 1300 received by the input unit 601 is copied to create design data for each of the paths P1 and P2.

In this way, for each of the paths P1 and P2 retrieved by the searching unit 606, the omission and the position of preventive measures are confirmed to check all potential errors in the operations process 1300.

Figure 14:
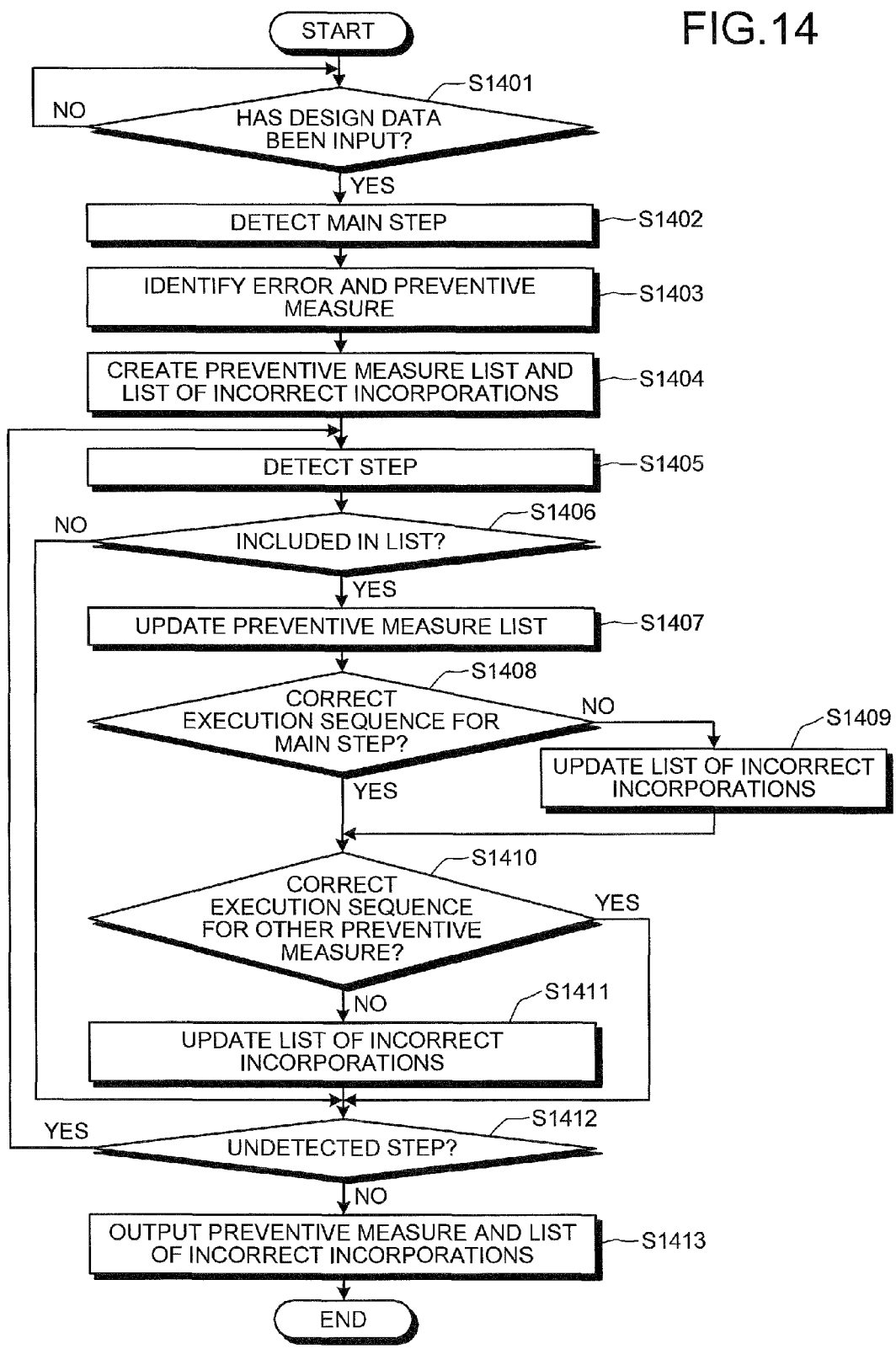
FIG. 14 is a flowchart of one example of a verification procedure for a verification apparatus according to the first embodiment.

FIG. 14 is a flowchart of one example of a verification procedure for a verification apparatus according to the first embodiment. As depicted in the flowchart of FIG. 14, it is determined whether the input unit 601 has received design data for an operations process to be verified (step S1401).

The input of the design data is waited for (step S1401: NO) and when the design data is input (step S1401: YES), the detecting unit 602 references the mapping information 300 and detects a main step among a series of steps in the operations process (step S1402).

The mapping information 300 is referenced and an error expected under the situation indicated by the tag information appended to the main step detected by the detecting unit 602 and a preventive measure against the error are identified (step S1403). A preventive measures list and a list of incorrect incorporations are created (step S1404). The preventive measures list and the list of incorrect incorporations created at step S1404 are in an initialized state.

The detecting unit 602, according to the execution sequence of a series of steps, detects a step among the series (step S1405) and the retrieving unit 603 determines whether the detected step is on the preventive measures list (step S1406). If the step is on the preventive list (step S1406: YES), the incorporation status of the preventive measure on the list is changed from "not incorporated" to "incorporated" (step S1407).

The determining unit 604, with respect to the preventive measure, determines whether the order in which the preventive measure detected at step S1405 and the main step detected at step S1402 are executed is correct (step S1408). If the order of execution is wrong (step S1408: NO), the list of incorrect incorporations is updated (step S1409), and the flow goes to step S1410. Specifically, a preventive measure determined to violate an incorporation positioning rule is added to the list of incorrect incorporations.

If it is determined that the order of execution is correct at step S1408 (step S1408: YES), the determining unit 604 determines whether the order of execution of the preventive measure detected at step S1405 with respect to a preventive measure whose incorporation status is "incorporated" in the preventive measures list is correct (step S1410).

If the order of execution is wrong (step S1410: NO), the list of incorrect incorporation is updated (step S1411) and it is determined whether a step remains undetected (step S1412). If the order of execution is correct (step S1410: YES), the flow goes to step S1412. If the preventive measure is not on the preventive measures list at step S1406 (step S1406: NO), the flow also goes to step S1412.

If there is an undetected step at step S1412 (step S1412: YES), the flow returns to and resumes from step S1405. If all steps have been detected (step S1412: NO), the output unit 605 outputs the preventive measures list and the list of incorrect incorporations (step S1413) and the flow ends.

As explained above, according to the first embodiment, it can be known whether a preventive measure has been incorporated into the correct position within the operations process to be verified. Further, a preventive measure that is necessary for the operations process but has not been incorporated can be identified.

Furthermore, for each path in the operations process, the omission and the position of a preventive measure are checked to check all potential errors in the operations process. In this way, the omission and the position of a preventive measure are properly checked to enable provision of a highly reliable operations process and reduced work load and time for design.

The first embodiment involves the use of registered steps, i.e., steps registered in the mapping information and to which tag information is appended, to design an operations process. A second embodiment involves the design of an operations process using non-registered steps, i.e., steps not registered in the mapping information. Components identical to those depicted in the first embodiment are given identical reference numerals and description thereof is omitted.

According to the first embodiment, the omission or the incorrect incorporation of a preventive measure can be checked for only registered steps. However, for example, the name of an action for a non-registered step is freely decided by the designer, whereby coincidence with a main step or preventive measure registered in the mapping information is difficult to determine.

Consequently, if reliability is checked, all actions for non-registered steps are disregarded; hence, high-reliability cannot be confirmed. On the other hand, in order to confirm high-reliability of an operations process that has been designed with non-registered steps, the non-registered steps need to be registered for the mapping information and redesign of the operations process using the newly registered steps is necessary, thereby increasing the cost for design.

Generally, concerning existing operations processes that are not designed with registered steps, a trade-off arises with respect to the first embodiment: high-reliability of operations process is confirmed at the expense of high cost or cost is curbed at the expense of reliability of operations process.

According to the second embodiment, a preventive measure incorporated into an operations process designed using non-registered steps is inferred and detected, thereby enabling verification of reliability for such an operations process. For inference of a preventive measure, key information characterizing the preventive measure is used. The key information includes two types: one designated by the designer and one extracted from an operations process.

The key information is explained. According to the first embodiment, a preventive measure is considered a single action; however, a preventive measure may be combined with another step or another preventive measure that is to be incorporated. Additionally, each combination has a characteristic. In the second embodiment, a preventive measure is a pattern formed by multiple elements.

A pattern is a combination of, for example, successive steps or non-successive steps. The key information includes information concerning an "applicable object", a "key action" and a "key form". The "applicable object" is information indicating to which operations process a preventive measure is applied depending on a main step. Applicable main steps may be plural.

A "key action" is information indicating an important key action in a preventive measure. Specifically, a "key action" includes information that characterizes the key action and concerns the contents of an action, an executing person, an object subject to the action, and an incorporation phase. Action contents indicate the contents of the action. An executing person is one (role) who executes a key action. An object is a resource (server, person, and so on) subject to the key action. Incorporation phase is a phase of an operations process to which a key action is applied.

"Key form" is information characterizing the form of a pattern (preventive measure) and is classified into two forms. A first form (hereinafter "transcend roles") indicates that actions correlated with a key action are successive and persons (roles) executing the actions are different. Namely, for the "transcend roles" form, an arrow indicating transition from a key action to a related action bridges partitions in an operations process.

A second form (hereinafter "error system") indicates an abnormal state occurring at the execution of a key action, and a response to the abnormal state. The "error system" may be indicated by an effective range (region) of the abnormal state.

Figure 15:
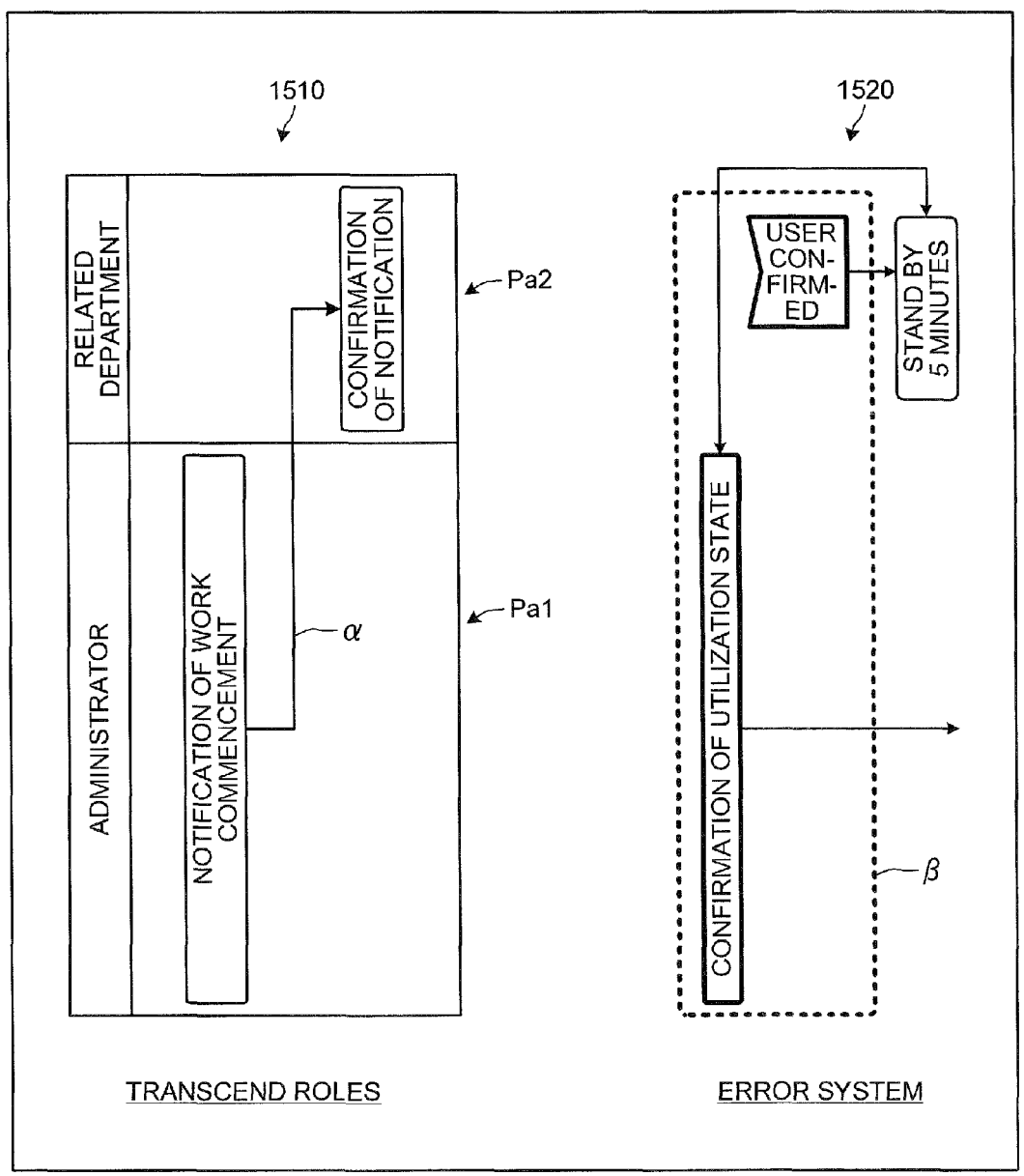
FIG. 15 is a diagram depicting an example of a preventive measure in terms of key-form.

FIG. 15 is a diagram depicting an example of a preventive measure in terms of key-form. As depicted in FIG. 15, a preventive measure 1510 has a key form, "transcend roles". The key action of the preventive measure 1510 is "notification of work commencement". The key form bridges the partition Pa1 of the executing person (administrator) executing the key action "notification of work commencement" and the partition Pa2 of the executing person (related department) executing a related action "confirmation of notification".

A preventive measure 1520 has a key form, "error system". The key action of the preventive measure 1520 is "confirmation of utilization state". "User confirmed" is an event indicating the occurrence of an abnormal state. The key form indicates the effective range of the abnormal state and any action within the effective range is interrupted by the occurrence of the abnormal state "user confirmed".

According to the second embodiment, a preventive measure necessary for an operations process is correlated with key information and is registered in the preventive measures list beforehand. The preventive measures list is implemented by, for example, the memory unit such as the magnetic disk 505 or the optical disc 507 depicted in FIG. 5.

FIG. 16 is a diagram depicting one example of a preventive measures list. As depicted in FIG. 16, a preventive measures list 1600 includes, for each preventive measure, information concerning a preventive measure ID, a preventive measure name, a key form, a key action, and an applicable object. The preventive measure ID is an identifier unique to each preventive measure. The preventive measure name is the name of a preventive measure. The key form, the key action, and the applicable object are items included in the key information.

In the case of a preventive measure "confirmation of utilization", the preventive measure ID is "2", the key form is "error system", the contents of the action is "confirmation of utilization state", the executing person is "identical to the main step", the object is "the entire system", the incorporation phase is "commencement preparation", and applicable objects include "patch application", "MW settings change", and "memory expansion".

At verification of reliability, the preventive measures list 1600 is referenced and for example, a preventive measure whose applicable object is a main step of an operations process to be verified is identified and an essential preventive measures list (for example, the preventive measures list 800 according to the first embodiment) for the operations process is created.

FIG. 17 is a diagram depicting one example of the essential preventive measures list. As depicted in FIG. 17, an essential preventive measures list 1700 includes, for each preventive measure, information concerning a preventive measure ID, a preventive measure name, a key form, a key action, and an incorporation status. Specifically, by referencing the preventive measures list 1600, a preventive measure whose applicable object is "patch application" becomes registered in the essential preventive measures list 1700.

In the case of the preventive measure "work performance supervision", the preventive measure ID is "6", the key form is "error system", the contents of the action is "supervision of performance", the executing person is "identical to a main step", the object is "the entire system", the incorporation phase is "termination step", and the incorporation status is "not incorporated".

Inference of a preventive measure is explained. Key information characterizing a step in the operations process subject to verification is identified based on design data concerning the operations process or information designated beforehand by the designer. The information designated beforehand by the designer is the object of a main step and of each action in the operations process.

Specifically, the detecting unit 602 detects a main step from among a series of steps by identifying the main step using the information designated beforehand by the designer. Further, using the design data concerning the operations process, the detecting unit 602 detects a key form in the operations process. For example, the detecting unit 602 detects an arrow (key form in FIG. 15) indicating a transition of steps bridging partitions of each executing person.

If the key form is identified, it is determined that a preventive measure "transcend roles" may be incorporated. Further, an event indicative of the occurrence of an abnormal state ("user confirmed" in FIG. 15) or an effective range of an abnormal state (key form in FIG. 15) may be identified. If an event indicative of the occurrence of an abnormal state or the key form is identified, it is determined that a preventive measure "abnormal system" may be incorporated.

Finally, a key action is inferred. To identify the key action, the key form is used. Since the key form has a determinate pattern (form), the range of the key form and which element at which position in the range is a key action can be identified.

For example, when key form is detected, the key action corresponding to the key form is the action at the base of an arrow (key form) indicating transition of steps bridging the partitions of executing persons. Next, key information of the identified key action is identified. Specifically, the contents of the action, the executing person, and the object are identified. An incorporation phase need not be identified at inference of a preventive measure because the incorporation phase is information used at verification of reliability after inference of the preventive measure.

More specifically, the contents of the action are identified based on the key action name. An executing person is specified by determining to whom the role of the partition including the key action belongs. The object is identified based on information designated beforehand by the designer. The preventive measures list 1600 is referenced and it is determined whether a preventive measure that includes key information coinciding with the key information identified is listed.

If key information coincides, it is determined that the preventive measure is incorporated in the operations process to be verified. The detecting unit 603 performs a series of processing to identify a key action based on the key form and to retrieve a coinciding preventive measure from key information associated with the key action by referencing the preventive measures list 1600.

Figure 18:
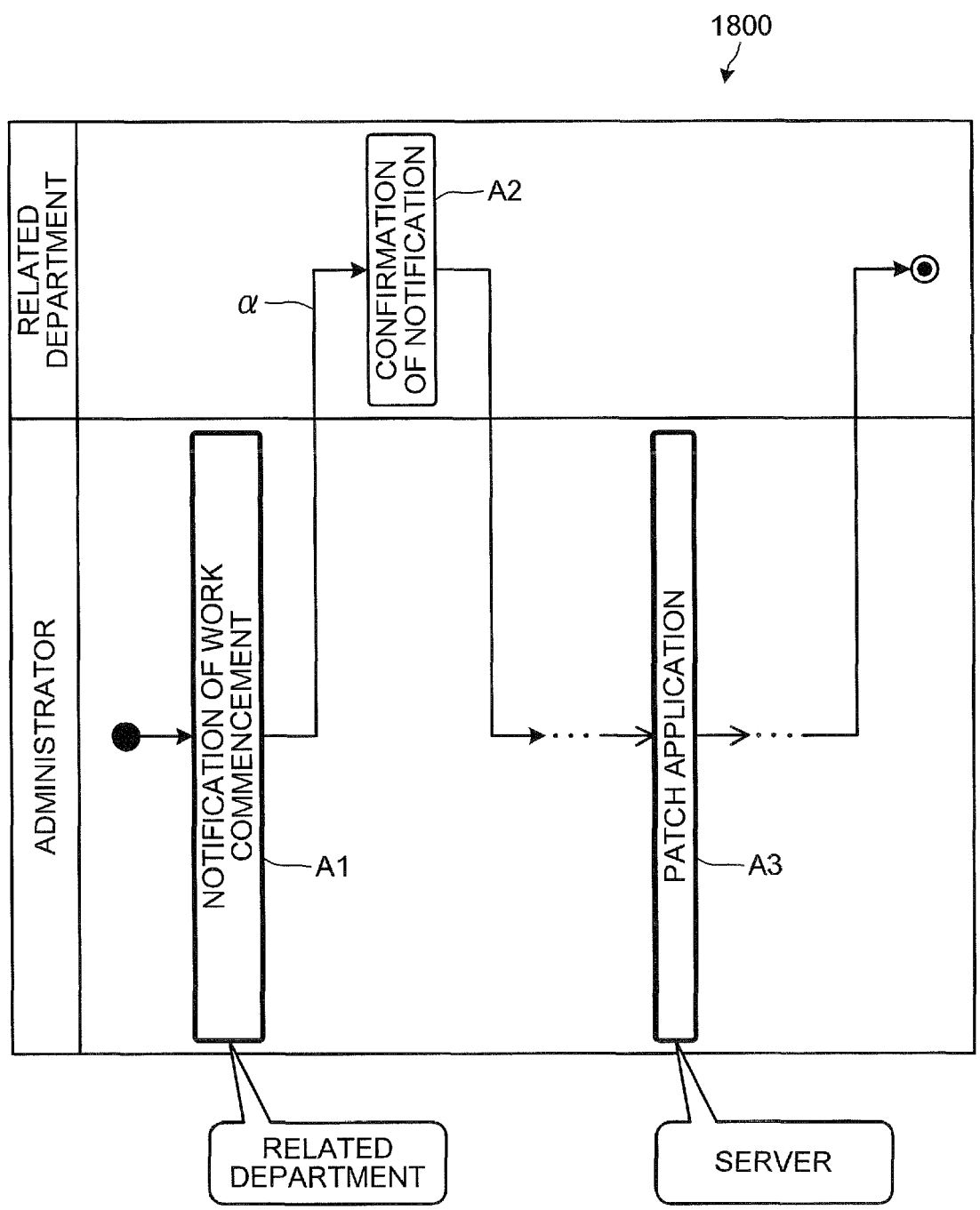
FIG. 18 is an activity diagram depicting part of an operations process.

An example of preventive measure inference is explained. FIG. 18 is an activity diagram depicting part of an operations process. As depicted in FIG. 18, an operations process 1800 includes part of an execution sequence for a series of steps (action A1 to A3) concerning the patch application.

The information designated beforehand by the designer, which is needed for inference of a preventive measure in the operations process 1800, is an action of the main step and an object of the action. It is assumed here that (1) an action A3 "patch application", the main step; (2) "related department", an object of an action A1 "notification of work commencement"; and (3) "server", an object of the action A3 "patch application" are designated.

With the aid of the information designated by the designer, a main step is detected from the operations process 1800 and the objects of the actions A1 and A3 are identified. Subsequently, the key form or (see FIG. 15) is detected from the operations process 1800. In this example, the key form indicating transition from the action A1 to A2 is detected. As a result, it is determined that a preventive measure "transcend roles" may be incorporated.

Next, a key action for a preventive measure is identified. In this example, the action A1 "notification of work commencement", which is incorporated at a position immediately before the key form, is identified as a key action. Further, key information (contents of an action, an executing person, an object) is identified for the action A1 as a key action.

Specifically, the contents of the action "notification of work commencement" is identified from the action name, the executing person "administrator" is identified from the partition to which the action A1 belongs, and the object "related department" is identified from the information designated beforehand by the designer. Next, from the identified key information, it is determined whether a preventive measure appearing in the preventive measures list 1600 of FIG. 16 has been registered.

In this exemplary embodiment, "notification of commencement" of the preventive measure ID1 appears in the list. Specifically, the contents of the action for the key action is "notification of work commencement" and the executing person is identical to the main step (administrator), thus matching the key information identified. Therefore, it is inferred that "notification of commencement" has been incorporated as a preventive measure into the operations process 1800. After inference of the preventive measures, reliability of the operations process can be verified according to the verification method described in the first embodiment.

Figure 19A:
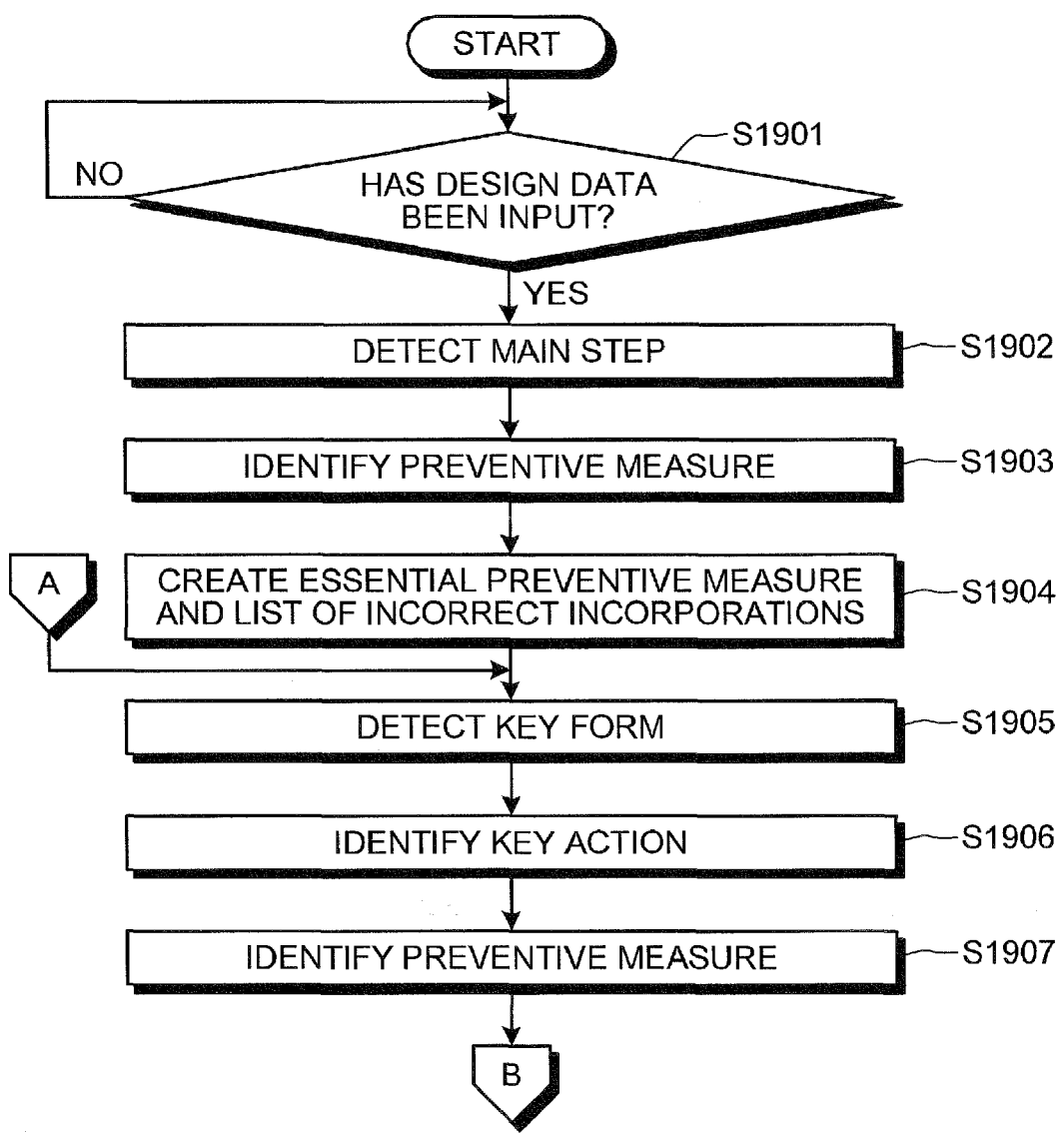
FIGS. 19A and 19B are flowcharts depicting one example of a verification procedure of the verification apparatus according to the second embodiment.
Figure 19B:
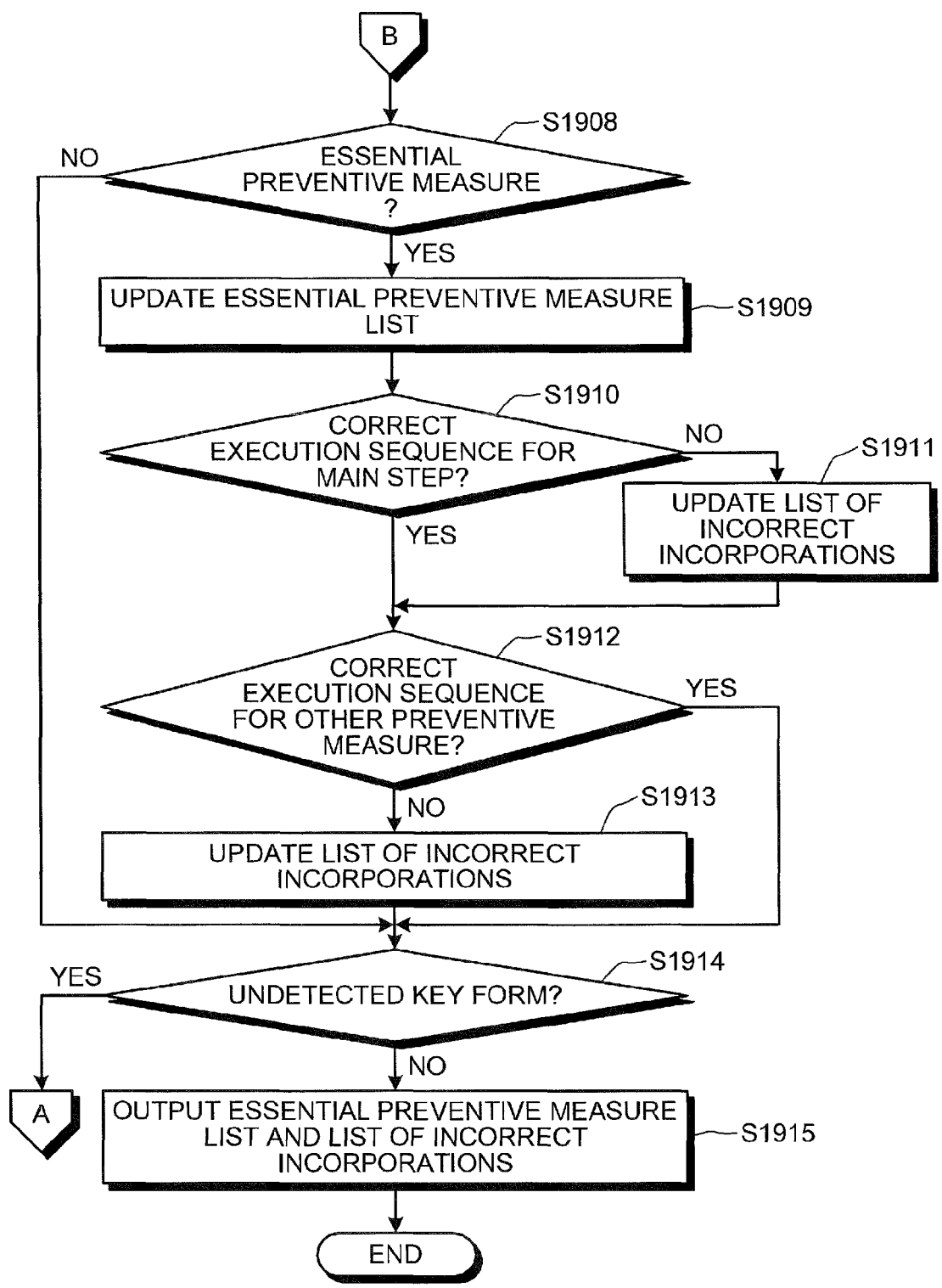

FIGS. 19A and 19B are flowcharts depicting one example of a verification procedure of the verification apparatus according to the second embodiment. As depicted in FIG. 19A, it is determined whether the input unit 601 has received design data concerning the operations process to be verified (step S1901).

The input of design data is waited for (step S1901: NO) and when the design data is input (step S1901:YES), the detecting unit 602 detects a main step from among a series of steps in the operations process using information designated beforehand by a designer (step S1902).

The preventive measures list 1600 is referenced and a preventive measure whose applicable object is the main step detected by the detecting unit 602 is identified (step S1903) and an essential preventive measures list and a list of incorrect incorporations are created (step S1904). The essential preventive measures list and the list of incorrect incorporations are in an initialized state.

The detecting unit 602, according to the execution sequence of the steps, detects a key form from among a series of steps (step S1905), and the retrieving unit 603 identifies a key action based on the key form detected (step S1906). The preventive measures list 1600 is reference and a preventive measure is identified from the key action (step S1907), and the flow goes to step S1908 depicted in FIG. 19B.

The essential preventive measures list created at step S1904 is referenced and it is determined whether the preventive measure identified at step S1907 of FIG. 19A is an essential preventive measure (step S1908). If the preventive measure is essential (step S1908:YES), an incorporation status of the corresponding preventive measure in the essential preventive measures list is changed from "not incorporated" to "incorporated" (step S1909).

The determining unit 604, with respect to the preventive measure, determines whether the order in which the preventive measure identified at step S1907 and the main step detected at step S1902 (step S1910) are executed is correct. If the order of execution is wrong (step S1910: NO), the list of incorrect incorporations is updated (step S1911), the flow goes to step S1912. Specifically, a preventive measure determined to violate an incorporation positioning rule is added to the list of incorrect incorporations.

If it is determined that the order of execution is correct at step S1910 (step S1910: YES), the determining unit 604 determines whether the order of execution of the preventive measure identified at step S1907 with respect to the preventive measure whose incorporation status in the essential preventive measures list is "incorporated" is correct (step S1912).

If the order of execution is wrong (step S1912: NO), the list of incorrect incorporations is updated (step S1913) and it is determined whether there is an undetected key form that has not been extracted among the series of steps (step S1914). If the order of execution is correct (step S1912: YES), the flow goes to step S1914. If the preventive measure identified at step S1907 of FIG. 19A is not an essential preventive measure (step S1908: NO), the flow goes to step S1914.

If an undetected key form remains at step S1914 (step S1914: YES), the flow returns to and resumes from step S1905 of FIG. 19A. If no undetected key forms remain (step S1914: NO), the output unit 605 outputs the essential preventive measures list and the list of incorrect incorporations (step S1915), and the flow is terminated.

As set forth above, according to the second embodiment, a preventive measure that is not a registered step is inferred, thereby enabling determination whether the preventive measure has been incorporated into the operations process at a proper position. Further, from among essential preventive measures to be incorporated into the operations process, preventive measures that have not been incorporated can be identified.

In this way, the omission and the position of incorporation of preventive measures in existing operations process can be checked, thereby enabling provision of a highly reliable operations process and reduction in the work load and time for design. In addition, since the redesign of an operations process using newly registered steps is not necessary, the cost for designing is reduced.

The method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The verification apparatus described in the present embodiment can be realized by an application specific integrated circuit (ASIC) such as a standard cell or a structured ASIC or a programmable logic device (PLD) such as a field-programmable gate array (FPGA). Specifically, for example, the functions of the units 601 to 606 of the verification apparatus are defined in hardware description language (HDL), which is logically synthesized and applied to the ASIC, the PLD, etc., thereby enabling manufacture of the verification apparatus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:
1. A non-transitory computer-readable recording medium storing therein a computer program causing a computer to execute:
   detecting a main step from among a series of steps to be verified;
   retrieving from among the series of steps, a sub-step to be a preventive measure against an error expected at execution of the main step;
   determining whether a position where the sub-step is incorporated into the series of steps is correct based on a sequence in which the sub-step and the main step are executed; and
   outputting a result of the determining,
   wherein
   the detecting includes referencing a table to detect the main step, the table correlating main steps with sub-steps that are respectively preventive measures against errors that have occurred at the execution of the main steps in given situations, and
   the retrieving includes referencing the table to retrieve the sub-step that is a preventive measure against an error that has occurred at the execution of the main step in a situation identified from attribute information appended to the main step.

2. The non-transitory computer-readable recording medium according to claim 1, wherein
the attribute information indicates contents of the main step, an executing person, an object acted upon, and step type and
the situation is identified based on the contents of the main step, the executing person, the object acted upon, and the step type.

3. The non-transitory computer-readable recording medium according to claim 1, wherein
the determining includes determining whether a sub-step remains undetected among sub-steps that are preventive measures against errors that have occurred at the execution of the main step in the situation identified from the attribute information.

4. A non-transitory computer-readable recording medium storing therein a computer program causing a computer to execute:
detecting a main step from among a series of steps to be verified;
retrieving from among the series of steps, a sub-step to be a preventive measure against an error expected at execution of the main step;
determining whether a position where the sub-step is incorporated into the series of steps is correct based on a sequence in which the sub-step and the main step are executed;
outputting a result of the determining; and
detecting among the series of steps, when the main step is detected referencing a table at the detecting the main step, a combination of successive steps for which the executing person differs, wherein
the retrieving includes referencing the table to retrieve the sub-step based on attribute information for a step executed first among the combination of successive steps.

5. The non-transitory computer-readable recording medium according to claim 4, wherein
the detecting the combination of successive steps includes detecting, from among the series of steps, a step having a key form of process for error system, and
the retrieving includes retrieving the sub-step based on attribute information for the step having the key form of process for error system.

6. The non-transitory computer-readable recording medium according to claim 4, further causing a computer:
to execute searching for paths from an initial step to a final step among the series of steps; and
to execute the detecting the main step, the retrieving, the determining, the outputting, and the detecting the combination of successive steps, for each path found at the searching.

7. A verification apparatus comprising:
a detecting unit that detects a main step from among a series of steps to be verified;
a retrieving unit that retrieves from among the series of steps, a sub-step to be a preventive measure against an error expected at execution of the main step;
a determining unit that determines whether a position where the sub-step is incorporated into the series of steps is correct based on a sequence in which the sub-step and the main step are executed; and
an output unit that outputs a result of the determining unit, wherein
the detecting unit references a table to detect the main step, the table correlating main steps with sub-steps that are respectively preventive measures against errors that have occurred at the execution of the main steps in given situations, and
the retrieving unit references the table to retrieve the sub-step that is a preventive measure against an error that has occurred at the execution of the main step in a situation identified from attribute information appended to the main step.

8. A verification method comprising:
detecting, using a microprocessor, a main step from among a series of steps to be verified;
retrieving from among the series of steps, a sub-step to be a preventive measure against an error expected at execution of the main step;
determining whether a position where the sub-step is incorporated into the series of steps is correct based on a sequence in which the sub-step and the main step are executed; and
outputting a result of the determining,
wherein
the detecting includes referencing a table to detect the main step, the table correlating main steps with sub-steps that are respectively preventive measures against errors that have occurred at the execution of the main steps in given situations, and
the retrieving includes referencing the table to retrieve the sub-step that is a preventive measure against an error that has occurred at the execution of the main step in a situation identified from attribute information appended to the main step.

9. A verification apparatus comprising:
a first detecting unit that detects a main step from among a series of steps to be verified;
a retrieving unit that retrieves from among the series of steps, a sub-step to be a preventive measure against an error expected at execution of the main step;
a determining unit that determines whether a position where the sub-step is incorporated into the series of steps is correct based on a sequence in which the sub-step and the main step are executed;
an output unit that outputs a result of the determining unit; and
a second detecting unit that references a table to detect among the series of steps, when the main step is detected at the detecting the main step, a combination of successive steps for which the executing person differs, wherein
the retrieving unit references the table to retrieve the sub-step based on attribute information for a step executed first among the combination of successive steps.

10. A verification method comprising:
detecting, using a microprocessor, a main step from among a series of steps to be verified;
retrieving from among the series of steps, a sub-step to be a preventive measure against an error expected at execution of the main step;
determining whether a position where the sub-step is incorporated into the series of steps is correct based on a sequence in which the sub-step and the main step are executed;
outputting a result of the determining; and
detecting among the series of steps, when the main step is detected referencing a table at the detecting the main step, a combination of successive steps for which the executing person differs, wherein
the retrieving includes referencing the table to retrieve the sub-step based on attribute information for a step executed first among the combination of successive steps.

* * * * *